US008313835B2

(12) United States Patent
Avgenaki et al.

(10) Patent No.: US 8,313,835 B2
(45) Date of Patent: Nov. 20, 2012

(54) PROCESS FOR THE PRODUCTION OF MULTI-LAYER COATINGS

(75) Inventors: Giannoula Avgenaki, Duesseldorf (DE); Marcus Brunner, Wuppertal (DE); Marc Chilla, Sprockhoevel (DE); Volker Paschmann, Essen (DE); Bruno Wokalek, Heiligenhaus (DE)

(73) Assignee: E I du Pont de Nemours and Company, Wilmington, DE (US)

( * ) Notice: Subject to any disclaimer, the term of this patent is extended or adjusted under 35 U.S.C. 154(b) by 688 days.

(21) Appl. No.: 11/990,068

(22) PCT Filed: Sep. 29, 2006

(86) PCT No.: PCT/US2006/037872

§ 371 (c)(1), (2), (4) Date: Sep. 15, 2009

(87) PCT Pub. No.: WO2007/041228

PCT Pub. Date: Apr. 12, 2007

(65) Prior Publication Data

US 2011/0045263 A1 Feb. 24, 2011

Related U.S. Application Data

(63) Continuation of application No. 11/238,476, filed on Sep. 25, 2005, now abandoned.

(51) Int. Cl.

*B32B 9/04* (2006.01)
*B05D 1/36* (2006.01)
*B05D 3/00* (2006.01)
*B05D 7/16* (2006.01)

(52) U.S. Cl. .................. 428/411.1; 427/407.1; 427/409; 427/419.1; 427/419.2; 427/419.5; 427/384; 427/385.5; 427/388.1; 427/388.4

(58) Field of Classification Search ............... 427/407.1, 427/409, 412.1, 412.3, 419.1, 419.2, 419.5, 427/372.2, 384, 385.5, 388.1, 388.4; 428/411.1
See application file for complete search history.

(56) References Cited

U.S. PATENT DOCUMENTS

| | | | | | |
|---|---|---|---|---|---|
| 3,032,397 | A * | 5/1962 | Niederhauser | ................ | 423/409 |
| 5,354,794 | A | 10/1994 | Stevenson et al. | | |
| 5,574,166 | A | 11/1996 | Winter et al. | | |
| 5,916,399 | A * | 6/1999 | Olsen | ............................ | 156/230 |
| 5,976,343 | A * | 11/1999 | Schlaak | ........................ | 205/198 |
| 6,368,719 | B1 | 4/2002 | Siever et al. | | |
| 2003/0054193 | A1 | 3/2003 | McCollum et al. | | |
| 2003/0098238 | A1 | 5/2003 | Kulfan et al. | | |
| 2006/0008588 | A1 | 1/2006 | Chilla et al. | | |
| 2006/0068116 | A1 | 3/2006 | Chilla et al. | | |
| 2006/0177639 | A1 | 8/2006 | Elzen et al. | | |
| 2007/0104874 | A1 | 5/2007 | Ogawa et al. | | |

FOREIGN PATENT DOCUMENTS

| | | | |
|---|---|---|---|
| DE | 4418490 | C2 | 5/1997 |
| EP | 0 306 224 | A1 * | 3/1989 |
| EP | 0576943 | A1 | 1/1997 |
| WO | WO 97/47401 | A1 | 12/1997 |

OTHER PUBLICATIONS

Copending U.S. Appl. No. 10/950,616, filed Sep. 27, 2004.
Copending U.S. Appl. No. 11/019,558, filed Dec. 22, 2004.
Copending U.S. Appl. No. 11/051,864, filed Feb. 4, 2005.
Copending U.S. Appl. No. 11/156,808, filed Jun. 20, 2005.

* cited by examiner

*Primary Examiner* — William Phillip Fletcher, III
(74) *Attorney, Agent, or Firm* — Brian J Myers

(57) ABSTRACT

A process for the production of multi-layer coatings comprising the successive steps: 1) applying an 8 to 20 μm thick coating layer from an aqueous coating composition A onto a substrate provided with an EDC primer, 2) applying a 5 to 15 μm thick base coat layer from an aqueous coating composition B onto the previously applied coating layer, 3) applying a clear coat layer onto the base coat layer, 4) jointly curing the three coating layers, wherein coating compositions A and B being different from each other and wherein the coating composition A contains at least one metal platelet pigment having a thickness from 10 to 100 nm in a proportion corresponding to a pigment/resin solids ratio by weight from 0.06:1 to 0.2:1.

6 Claims, No Drawings

PROCESS FOR THE PRODUCTION OF MULTI-LAYER COATINGS

This application a national stage entry of PCT/US2006/037872, filed Sep. 29, 2006, which claims priority of U.S. application Ser. No. 11/238,476, filed Sep. 29, 2005, now abandoned.

BACKGROUND OF THE INVENTION

The invention relates to a process for the production of multi-layer coatings.

DESCRIPTION OF THE PRIOR ART

Automotive coatings consist, as a rule, of a separately baked electrodeposition coating (EDC) primer, a separately baked primer surfacer layer (filler layer) applied thereto and 20 to 35 μm thick in general and a top coat applied thereto comprising a wet-on-wet applied color- and/or special effect-imparting base coat layer, 10 to 25 μm thick in general, and a protective, gloss-imparting clear coat layer. The total primer surfacer plus base coat layer thickness is generally 30 to 60 μm.

There is the desire to decrease total primer surfacer plus base coat layer thickness and to avoid the application of a primer surfacer layer and the separate baking thereof.

Processes are known from WO 97/47401 and U.S. Pat. No. 5,976,343 for the production of decorative multi-layer coatings, which processes allow for the elimination of the application and separate baking of a primer surfacer layer which, of course, reduces coating material consumption and the total layer thickness. These processes have in common the fact that a multi-layer coating structure comprising a first, modified water-borne base coat, a second, unmodified water-borne base coat and a clear coat is applied by a wet-on-wet-on-wet process comprising the joint curing of these three coating layers that are applied to a baked EDC primer. In practice, these processes use two base coat layers that allow for markedly lower total layer thicknesses by approximately 15 to 25 μm, than that of a conventional primer surfacer and base coat. The modified water-borne base coat is produced in these processes from an unmodified water-borne base coat by mixing with an admixture component and is intended to replace the function of a conventional primer surfacer. WO 97/47401 recommends as an admixture component, the addition of polyisocyanate crosslinking agent, while U.S. Pat. No. 5,976,343 describes the addition of polyurethane resin.

A weakness of the processes known from WO 97/47401 and U.S. Pat. No. 5,976,343 is that it is not readily possible to produce multi-layer coatings in certain color shades ("problematic color shades"). The reason is UV light (UV radiation), as a constituent of natural daylight, passes through the coating layers applied to the EDC primer to the surface of the EDC primer to a noticeable extent in the absence of a primer surfacer layer and causes degradation of the EDC primer.

The color shades which are problematic with regard to the production of primer surfacer-free multi-layer coatings are those which, while (like unproblematic color shades) providing a coating which appears to an observer to be opaque, permit an inadmissibly large amount of UV light to penetrate through the multi-layer structure consisting of clear coat, unmodified water-borne base coat and modified water-borne base coat to the surface of the EDC primer and cause long term damage to the EDC layer. Such problematic color shades are to be found both among single (plain) color shades and special effect color shades. Examples may, in particular, be found among water-borne base coats with dark blue single color shades based on phthalocyanine pigments and among water-borne base coats with specific special effect color shades, for example, dark blue metallic color shades or light metallic color shades, such as, in particular, silver color shades and among water-borne base coats with specific special effect color shades containing elevated proportions, for example, 50 wt. % or more, of mica pigments (special effect pigments on the basis of coated, in particular, metal oxide-coated mica) in the pigment content. In the case of the problematic color shades, the UV light may penetrate through the multi-layer coating structure, for example, to an extent exceeding the specified UV transmission level and reaches the EDC layer.

Car manufacturers' specifications state, for example, that UV transmission through the base coat layer in the area of the complete outer skin of the vehicle body should amount to less than 0.1% in the wavelength range of from 280 to 380 nm, less than 0.5% in the wavelength range of from 380 to 400 nm and less than 1% in the wavelength range of from 400 to 450 nm. The possible undesired long-term consequences of an inadmissible level of UV light penetration to the EDC layer are chalking of the EDC layer and delamination of the multi-layer coating over the service life of the coated substrates.

Alternatively, the modified and/or the unmodified water-borne base coat could be applied in an overall higher layer thickness sufficient to prevent to an adequate degree the access of UV light to the EDC primer. However, this would be a backward technological step in the direction of high total film thickness.

The use of UV absorbers in clear coats or base coats is known, for example, from U.S. Pat. No. 5,574,166 and WO 94/18278, and is a solution to the problem of delamination. However, UV absorbers cannot be used to a very great extent in the base coat layers and/or the clear coat layer because of the migration tendency of the UV absorbers and because of the gradual degradation of the UV absorbers, as well as for cost reasons.

Other solutions, which approach the delamination problem from the EDC side are known from EP 0 576 943 A1, U.S. Pat. No. 6,368,719, U.S. 2003/0054193 A1 and U.S. 2003/0098238 A1. These disclose the use of EDC coating compositions which are resistant to the action of UV light due to specially selected binders or due to the addition of suitable additives. This inevitably restricts the EDC composition, such that concessions may have to be made in relation to other technological properties, such as, for example, corrosion protection.

It has been found that it is possible to produce multi-layer coatings with a low total coating thickness without separate baking of a conventional primer surfacer layer, and to be able to sufficiently prevent a long term damaging access of UV light to the EDC primer if a first thin coating layer of an aqueous coating composition containing a small amount of at least one metal platelet pigment (metal flake pigment) having a thickness from 10 to 100 nm, a second coating layer of a water-borne base coat and a clear coat layer are applied wet-on-wet-on-wet and jointly baked.

SUMMARY OF THE INVENTION

The invention is directed to a process for the production of multi-layer coatings comprising the successive steps:

1) application of an 8 to 20 μm thick coating layer from an aqueous coating composition A onto a substrate provided with an EDC primer, 2) application of a 5 to 15 μm thick base coat layer from an aqueous coating composition B onto the previously applied coating layer, 3) application of a clear coat layer onto the base coat layer, 4) joint curing of the three coating layers, wherein coating compositions A and B are different from each other and wherein the coating composition A contains at least one metal platelet pigment having a thickness from 10 to 100 nm in a proportion corresponding to a pigment/resin solids ratio by weight from 0.06:1 to 0.2:1.

DETAILED DESCRIPTION OF THE EMBODIMENTS

In the process according to the invention, conventional substrates provided with an EDC primer are coated. In particular, the substrates are automotive bodies or automotive body parts provided with an EDC primer, in particular, a cathodic electrodeposition (CED) coating. The production of substrates provided with an EDC primer is known to the person skilled in the art. There are no restrictions with regard to the selection of the EDC primer, in particular, EDC primers are also suitable which would be damaged by long-term exposure to UV light.

The substrates having an EDC primer are provided, first of all, with a coating layer of an aqueous coating composition A in a process film thickness in the range from 8 to 20 μm and then with a base coat layer of an aqueous coating composition B in a process film thickness of 5 to 15 μm. The sum of the coating thickness for the two-layer coatings produced from the coating compositions A and B is, for example, 15 to 35 μm. The film thickness of each individual coating layer and as a result the total film thickness is dependent inter alia on color shade; car manufacturers' requirements for the respective film thicknesses are expressed in the so-called process film thickness (average film thickness which is desired over the entire body in the automotive original coating process), which is directed towards the film thickness for each color shade required to achieve the desired color shade on the substrate and to achieve technological properties (e.g., stone chip resistance) and towards an economic application of the relevant coating composition, i.e., in as thin a film as possible. The ranges of 8 to 20 μm film thickness for the coating layer of coating composition A and of 5 to 15 μm film thickness for the coating layer of coating composition B meet the requirements for coating the relevant substrates, for example, automotive bodies. In particular, this means that a specific value within the stated ranges represents the process film thickness for the respective coating layer.

The film thicknesses (layer thicknesses, coating thicknesses) indicated in the present description and in the claims for coating layers refer in each case to dry film thicknesses.

The coating compositions A are aqueous coating compositions having solids contents of, for example, 12 to 35 wt. %, preferably from 15 to 30 wt. %. The solids content is formed from the resin solids, the pigment content comprising the metal platelet pigment having a thickness from 10 to 100 nm, optionally contained fillers (extenders) and optionally contained non-volatile additives. The resin solids are composed of the binder solids and of the solids contribution of the crosslinking agent(s) optionally contained in the coating composition A. In addition to one or more binders, the binder solids also, optionally, comprise reactive diluents contained in the coating composition A.

The term "pigment content" used in the description and the claims means the sum of all the pigments contained in a coating composition without fillers. The term "pigments" is used here as in DIN 55944 and covers, in addition to special effect pigments, inorganic white, colored and black pigments and organic colored and black pigments. At the same time, therefore, DIN 55944 distinguishes between pigments and fillers.

The aqueous coating compositions A are referred to in the description and the claims as coating compositions A for short. The coating compositions A are specially produced coating compositions, and especially not coating compositions produced from coating compositions B by mixing with admixture components, for example, pigmented or unpigmented binders, pigmented or unpigmented polyisocyanate preparations or pigment pastes.

In addition to water, the resin solids, the pigment content, optionally fillers and optionally organic solvents, the coating compositions A may also contain conventional coating additives.

The resin solids of the coating compositions A may comprise one or more binders. Examples include polyester, polyurethane and (meth)acrylic copolymer resins and also hybrid binders derived from these binder classes. Preferably, the resin solids of the coating compositions A comprise polyurethane resin and/or are crosslinkable by formation of urethane groups. Resin solids that are crosslinkable by formation of urethane groups, generally comprise at least one hydroxyl functional binder and at least one polyisocyanate crosslinking agent; one or more hydroxyl functional binders corresponding to a hydroxyl number of, for example, 10 to 180 mg KOH/g of binder solids are, for example, contained, and the solids ratio by weight of binder solids and polyisocyanate crosslinking agent is, for example, 1:1 to 10:1.

The binders and/or cross-linking agents contained in the resin solids are ionically and/or non-ionically, preferably anionically and/or non-ionically stabilized. Anionic stabilization is preferably achieved by at least partially neutralized carboxyl groups, while non-ionic stabilization is preferably achieved by lateral or terminal polyethylene oxide units.

The term "polyurethane resin" used in the description and the claims does not rule out that the polyurethane resin in question may also contain groups other than urethane groups in the polymer backbone, such as, in particular, ester groups and/or urea groups. Instead, the term "polyurethane resin" of course, also in particular, includes polyurethane resins which contain polyester polyol building blocks and/or urea groups, wherein the latter may, for example, be formed by the reaction of isocyanate groups with water and/or polyamine.

The term "polyisocyanate crosslinking agent(s)" is not restricted to the meaning "free polyisocyanate(s)", but instead also includes blocked polyisocyanate(s). The polyisocyanate(s) accordingly comprise one or more free polyisocyanates, one or more blocked polyisocyanates or a combination of one or more free polyisocyanates and one or more blocked polyisocyanates. Free polyisocyanates are preferred.

The polyisocyanates comprise di- and/or polyisocyanates with aliphatically, cycloaliphatically, araliphatically and/or less preferably aromatically attached isocyanate groups.

The polyisocyanates are liquid at room temperature or are present as an organic solution; the polyisocyanates here exhibit at 23° C. a viscosity of in general 0.5 to 2000 mPa·s. The isocyanate content of the polyisocyanates present in the form of free or latent (blocked, thermally redissociable) isocyanate groups is in general in a range from 2 to 25 wt. %, preferably, from 5 to 25 wt. % (calculated as NCO).

Examples of diisocyanates are hexamethylene diisocyanate, tetramethylxylylene diisocyanate, isophorone diisocyanate, dicyclohexylmethane diisocyanate, and cyclohexane diisocyanate.

Examples of polyisocyanates are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups.

Of particular suitability are, for example, "coating polyisocyanates" based on hexamethylene diisocyanate, isophorone diisocyanate or dicyclohexylmethane diisocyanate. "Coating polyisocyanates" based on these diisocyanates means the per se known biuret, urethane, uretidione and/or isocyanurate group-containing derivatives of these diisocyanates.

As already mentioned above, the polyisocyanates may be used in blocked form, though this is not preferred. They may be blocked with conventional blocking agents that can be de-blocked under the action of heat, for example, with alcohols, oximes, amines and/or CH-acidic compounds.

The blocked or preferably free polyisocyanates may be used as such or as a preparation containing water and/or organic solvent, wherein in the case of free polyisocyanate no water and no organic solvent with active hydrogen is used. It may be desirable, for example, for the polyisocyanates to be pre-diluted with a water-miscible organic solvent or solvent mixture. In this case, it is preferable to use solvents, which are inert relative to isocyanate groups, especially where the preferred free polyisocyanates are used. Examples are solvents which do not contain any active hydrogen, for example, ethers, such as, for example, diethylene glycol diethyl ether, dipropylene glycol dimethyl ether; glycol ether esters, such as, ethylene glycol monobutyl ether acetate, diethylene glycol monobutyl ether acetate, methoxypropyl acetate; and N-methylpyrrolidone.

Also suitable are hydrophilic polyisocyanates, which may be stabilized in the aqueous phase by a sufficient number of ionic groups and/or by terminal or lateral polyether chains. Hydrophilic polyisocyanates are sold as commercial products, for example, by Bayer under the name Bayhydur®.

The coating composition A contains at least one metal platelet pigment having a thickness from 10 to 100 nm in a proportion corresponding to a pigment/resin solids ratio by weight from 0.06:1 to 0.2:1. This content of the at least one metal platelet pigment having a thickness from 10 to 100 nm in the coating composition A is responsible for the fact that UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm. It should be noted that even such small amounts of the at least one metal platelet pigment having a thickness from 10 to 100 nm in the coating composition A are sufficient to ensure that UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm.

The UV transmission may be measured in that a corresponding coating structure applied from the coating compositions A and B is applied to a UV light-transparent support, for example, a quartz glass plate, and the UV transmission is measured in the corresponding wavelength range using a corresponding uncoated, UV light-transparent support as a reference.

The 10 to 100 nm, preferably 20 to 80 nm thick metal platelet pigments are special effect pigments, have a mean particle diameter of, for example, 5 to 30 μm, preferably 5 to 20 μm, and consist in particular of aluminum. The term "mean particle diameter" refers to d50 values determined by laser diffraction (50% of the particles have a particle diameter above and 50% of the particles have a particle diameter below the mean particle diameter), such as may be inferred, for example, from the technical documents of manufacturers of aluminum platelet pigments. The 10 to 100 nm thick metal platelet pigments are produced, for example, by vacuum deposition or ultrathin grinding of special aluminum grits. The 10 to 100 nm thick metal platelet pigments may be unpassivated or passivated. Passivated types are, for example, phosphated, chromated or coated with a silicon-oxygen network. Passivated types are preferably used.

Such 10 to 100 nm thick metal platelet pigments are commercially available in both passivated and unpassivated form. Examples of such metal platelet pigments are the metal pigments sold under the names Metalure®, Platindollar® and Hydroshine®, in each case by Eckart, Metasheen® by Wolstenholme, Starbrite® by Silberline and Decomet® by Schlenk.

The pigment content of the coating composition A may consist exclusively of the at least one metal platelet pigment having a thickness from 10 to 100 nm or it may also comprise, for coloristic reasons, one or more pigments other than metal platelet pigments having a thickness from 10 to 100 nm. However, in the latter case, there is the restriction that the nature and/or proportion in the coating composition A of such pigments other than metal platelet pigments having a thickness from 10 to 100 nm is/are to be selected such that a two-layer coating, which is applied from the coating composition A in a layer thickness above its black/white opacity (black/white hiding power) and is overcoated with 35 μm of clear coat, exhibits a brightness L* (according to CIEL*a*b*, DIN 6174), measured at an illumination angle of 45 degrees to the perpendicular (surface normal) and an observation angle of 15 degrees to the specular (specular reflection), of at least 80 units. It will be clear to a person skilled in the art, and will not need to be pointed out, that the clear coat used in the application of the process according to the invention is to be used in this case.

The term "black/white opacity" is used in the description and the claims. It refers to the dry coating thickness of a coating composition wherein the contrast between the black and white fields of a black and white chart coated with the coating composition is no longer visually discernible (mean value determined on the basis of evaluation by 5 independent individuals. Following ISO 6504-3:2006 (E), method B, in order to determine this coating thickness, the coating composition of which the black/white opacity is to be investigated may be applied in a wedge shape onto a black and white chart and dried or hardened.

If, for coloristic reasons, the coating compositions A contain one or more pigments other than metal platelet pigments having a thickness from 10 to 100 nm, said pigments are only secondarily, if at all, responsible for the fact that UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm. Rather, this effect is achieved substantially owing to the content of the at least one metal platelet pigment having a thickness from 10 to 100 nm. In other words, the nature and/or proportion of the pigment or pigments other than metal platelet pigments having a thickness from 10 to 100 nm, which may, for coloristic reasons, optionally be contained in the coating composition A, is/are also restricted, in addition to the restriction described above, such that the effect whereby UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm, is not caused, or is not only caused, by the presence of the pigments other than metal platelet pigments having a thickness from 10 to 100 nm, and also not in interaction with fillers that may be contained in the coating composition A.

The pigment(s) that may optionally be contained in the coating compositions A, in addition to the at least one metal platelet pigment having a thickness from 10 to 100 nm, may, for example, be other special effect pigments and/or pigments selected from white, colored and black pigments. If the coating compositions A contain one or more further pigments, in addition to the at least one metal platelet pigment having a thickness from 10 to 100 nm, the total pigment/resin solids ratio by weight is from more than 0.06:1 to 0.4:1, preferably less than 0.3:1.

Examples of special effect pigments other than the at least one metal platelet pigment having a thickness from 10 to 100 nm include conventional pigments imparting to a coating a color and/or lightness flop dependent on the angle of observation, such as non-leafing metal pigments, e.g., of aluminum, copper or other metals, with a higher platelet thickness, for example, ranging from above 100 to 500 nm, interference pigments such as, for example, metal oxide-coated metal pigments, e.g., iron oxide-coated aluminum, coated mica such as, for example, titanium dioxide-coated mica, graphite effect-imparting pigments, iron oxide in flake form, liquid crystal pigments, coated aluminum oxide pigments, and coated silicon dioxide pigments. Said non-leafing aluminum pigments are known to the person skilled in the art; they may be passivated, for example, by what is known as phosphating (treatment with phosphoric and/or phosphonic acid derivatives), chromating or with a coating of a silicon-oxygen network. Examples of commercially available non-leafing aluminum platelet pigments passivated by phosphating are the non-leafing aluminum platelet pigments sold by the firm Eckart-Werke under the name "STAPA Hydrolac®". Examples of commercially available non-leafing aluminum platelet pigments passivated by chromating are the non-leafing aluminum platelet pigments sold by the firm Eckart-Werke under the name "STAPA Hydrolux®". Examples of commercially available non-leafing aluminum platelet pigments coated with a silicon-oxygen network are the non-leafing aluminum platelet pigments sold by the firm Eckart-Werke under the name "STAPA IL Hydrolan®" and those sold by the firm Schlenk under the name "Aquamet® CP".

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The process according to the invention is generally used to coat substrates in series in a color shade program comprising a plurality of, for example, 10 to 1.5 color shades, i.e., a corresponding number of coating compositions B of different colors is used. However, the same number of differently pigmented coating compositions A does not have to be used; rather, a smaller number, for example, a single or a few, for example, 2 to 5, differently pigmented coating compositions A are generally sufficient.

The coating compositions A may also contain one or more fillers, for example, in a proportion of up to 20 wt. % based on the resin solids. Nevertheless, as with the pigments other than metal platelet pigments having a thickness from 10 to 100 nm, there is the restriction that the nature and proportion in the coating composition A of the filler(s) is/are to be selected such that a two-layer coating, which is applied from the coating composition A in a layer thickness above its black/white opacity and is overcoated with 35 μm of clear coat, exhibits a brightness L* (according to CIEL*a*b*, DIN 6174), measured at an illumination angle of 45 degrees to the perpendicular and an observation angle of 15 degrees to the specular, of at least 80 units. The fillers do not constitute part of the pigment content of the coating compositions A. Examples are barium sulfate, kaolin, talcum, silicon dioxide, layered silicates and any mixtures thereof.

If the coating compositions A contain one or more fillers, said filler(s) are only secondarily, if at all, responsible for the fact that UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm. Rather, this effect is achieved substantially owing to the content of the at least one metal platelet pigment having a thickness from 10 to 100 nm. In other words, the nature and/or proportion of the filler(s) that may be contained in the coating composition A, is/are also restricted, in addition to the restriction described in the foregoing paragraph, such that the effect whereby UV light is able to penetrate through a coating structure formed from coating compositions A and B only in accordance with a UV transmission of less than 0.1% in the wavelength range from 280 to 380 nm, of less than 0.5% in the wavelength range from 380 to 400 nm and of less than 1% in the wavelength range from 400 to 450 nm, is not caused, or is not only caused, by the presence of the filler(s), and also not in interaction with pigments other than metal platelet pigments having a thickness from 10 to 100 nm that may be contained in the coating composition A.

With the exception of the at least one metal platelet pigment having a thickness from 10 to 100 nm as well as the optional additional special effect pigments, the other pigments that are optionally contained in the pigment content of the coating composition A are generally ground. The grinding may be performed in conventional assemblies known to the person skilled in the art. Generally, the grinding takes place in a proportion of the binder or in specific grinding resins (paste resins). The formulation is then completed with the remaining proportion of the binder or of the paste resin.

The at least one metal platelet pigment having a thickness from 10 to 100 nm and the optional additional special effect pigments are not ground, but are generally initially introduced in the form of a commercially available paste, optionally, combined with preferably water-miscible organic solvents and optionally additives, and then mixed with the binder(s). Metal platelet pigments having a thickness from 10 to 100 nm and optional additional special effect pigments in powder form may first be processed with preferably water-miscible organic solvents and optionally additives to yield a paste.

The water content of the coating compositions A is, for example, 60 to 88 wt. %.

The aqueous coating compositions A may contain conventional solvents, for example, in a proportion of 0 to 20 wt. %. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether, glycols, for example, ethylene glycol and/or propylene glycol, and the di- or trimers thereof; N-alkylpyrrolidone, such as, for example, N-methylpyrrolidone; ketones, such as, methyl ethyl ketone, acetone, cyclohexanone; aromatic or aliphatic hydrocarbons, for example, toluene, xylene or linear or branched aliphatic C6-C12 hydrocarbons.

The aqueous coating compositions A may contain conventional additives in conventional quantities, for example, of 0.1 to 5 wt. %, relative to their solids content. Examples are antifoaming agents, wetting agents, adhesion promoters, catalysts, leveling agents, anticratering agents, thickeners and light stabilizers, for example, UV absorbers and/or HALS-based compounds (HALS, hindered amine light stabilizers). If the coating compositions A contain light stabilizers, these are by no means solely responsible for UV light being able to penetrate through a coating structure formed from coating compositions A and B only in accordance with a UV transmission of less than 0.1% in the wavelength range of from 280 to 380 nm, of less than 0.5% in the wavelength range of from 380 to 400 nm and of less than 1% in the wavelength range of from 400 to 450 nm. This effect is instead, in particular with regard to the durability thereof, achieved by the coating compositions' A content of the at least one metal platelet pigment having a thickness from 10 to 100 nm.

The coating compositions B are water-borne base coats, such as are conventional in the production of base coat/clear coat two-layer coatings of car bodies and body parts. The aqueous coating compositions B are also referred in the present description and the claims as coating compositions B or as water-borne base coats B for short.

The water-borne base coats B have solids contents of, for example, 10 to 40 wt. %, preferably from 15 to 30 wt. %. The ratio by weight of pigment content to resin solids is, for example, 0.05:1 to 0.6:1. In addition to water, a resin solids content, which comprises binder(s), optionally, paste resin(s) and optionally, cross-linking agent(s), pigment(s), optionally, filler(s) and optionally, organic solvent(s), they contain in general also conventional additive(s).

The water-borne base coats B contain ionically and/or non-ionically stabilized binder systems. These are preferably anionically and/or non-ionically stabilized. Anionic stabilization is preferably achieved by at least partially neutralized carboxyl groups in the binder, while non-ionic stabilization is preferably achieved by lateral or terminal polyethylene oxide units in the binder. The water-borne base coats B may be physically drying or crosslinkable by formation of covalent bonds. The water-borne base coats B crosslinkable by forming covalent bonds may be self- or externally crosslinkable systems.

The water-borne base coats B contain one or more conventional film-forming binders. They may optionally also contain crosslinking agents if the binders are not self-crosslinkable or physically drying. Examples of film-forming binders, which may be used, are conventional polyester, polyurethane, (meth)acrylic copolymer and hybrid resins derived from these classes of resin. Selection of the optionally contained crosslinking agents depends, in a manner familiar to the person skilled in the art, on the functionality of the binders, i.e., the crosslinking agents are selected in such a way that they exhibit a reactive functionality complementary to the functionality of the binders. Examples of such complementary functionalities between binder and crosslinking agent are: carboxyl/epoxy, hydroxyl/methylol ether and/or methylol (methylol ether and/or methylol preferably, as crosslinkable groups of aminoplast resins, in particular, melamine resins).

The water-borne base coats B contain conventional pigments, for example, special effect pigments and/or pigments selected from among white, colored and black pigments. The water-borne base coats B preferably do not contain any metal platelet pigments having a thickness from 10 to 100 nm. However, if they do, the proportion of said pigments is below a proportion corresponding to a pigment/resin solids ratio by weight of 0.06:1.

Examples of special effect pigments are the same as have been described above as examples of special effect pigments which can be used in coating compositions A.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The water-borne base coats B are, in particular, those having problematic color shades, i.e., water-borne base coats B that are distinguished in that UV light corresponding to a UV transmission of more than 0.1% in the wavelength range of from 280 to 380 nm and/or of more than 0.5% in the wavelength range of from 380 to 400 nm and/or of more than 1% in the wavelength range of from 400 to 450 nm may penetrate through a two-layer coating structure consisting of a 10 μm thick layer applied from a mixture produced in a resin solids ratio by weight of 1.5 pbw (parts by weight) water-borne base coat B to 1 pbw trimeric hexane diisocyanate-polyisocyanate (hexane diisocyanate-isocyanurate), and a 5 μm thick layer applied from the water-borne base coat B itself.

In other words, the water-borne base coats B with problematic color shades have such low levels of pigmentation (ratio by weight of pigment content to resin solids content) and/or such pigment contents that, by virtue of the type and proportion of the constituent pigments, UV light corresponding to a UV transmission of more than 0.1% in the wavelength range of from 280 to 380 nm and/or of more than 0.5% in the wavelength range of from 380 to 400 nm and/or of more than 1% in the wavelength range of from 400 to 450 nm may penetrate through a two-layer coating structure consisting of a 10 μm thick layer applied from a mixture produced in a resin solids ratio by weight of 1.5 pbw water-borne base coat B to 1 pbw trimeric hexane diisocyanate-polyisocyanate (hexane diisocyanate-isocyanurate), and a 5 μm thick layer applied from the water-borne base coat B itself.

Desmodur® N 3600 from Bayer is a commercially available trimeric hexane diisocyanate-polyisocyanate that may be used, for example, in the aforementioned context.

The water-borne base coats B with problematic color shades accordingly have excessively low levels of pigmentation and/or pigment contents without or with excessively small proportions of pigments which effectively reduce UV transmission. Such water-borne base coats B with problematic color shades may be found among water-borne base coats B both with single color shades and with special effect color shades. Examples may in particular be found among water-borne base coats B with dark blue single color shades based on phthalocyanine pigments and among water-borne base coats B with specific special effect color shades, for example, dark blue metallic color shades or light metallic color shades, such as, in particular, silver color shades and among water-borne base coats B with specific special effect color shades containing elevated proportions, for example, 50 wt. % or more, of mica pigments (special effect pigments on the basis of coated, in particular, metal oxide-coated mica) in the pigment content. Water-borne base coats B with light metallic color shades or silver color shades as a specific subgroup of light metallic color shades are coating compositions when applied in a layer thickness above their black/white opacity and overcoated with a 35 μm thick clear coat exhibit a brightness L* (according to CIEL*a*b*, DIN 6174), measured at an illumination angle of 45 degrees to the perpendicular and an observation angle of 15 degrees to the specular reflection of at least 80 units.

The UV transmission measurement mentioned above may be carried out in that a two-layer coating consisting of a 10 μm thick layer applied from a mixture produced in a resin solids ratio by weight of 1.5 pbw water-borne base coat B to 1 pbw trimeric hexane diisocyanate-polyisocyanate (hexane diisocyanate-isocyanurate), and a 5 μm thick layer applied from the water-borne base coat B itself is applied to a UV light-transparent support, for example, a quartz glass plate, and the UV transmission is measured in the corresponding wavelength range using a corresponding uncoated, UV light-transparent support as a reference.

The water-borne base coats B may also contain one or more fillers, for example, in proportions of 0 to 30 wt. % relative to the resin solids content. The fillers do not constitute part of the pigment content of the water-borne base coats B. Examples are barium sulfate, kaolin, talcum, silicon dioxide, layered silicates and any mixtures thereof.

The special effect pigments are generally initially introduced in the form of a conventional commercial aqueous or non-aqueous paste, optionally, combined with preferably water-dilutable organic solvents and additives and then mixed with aqueous binder. Pulverulent special effect pigments may first be processed with preferably water-dilutable organic solvents and, optionally, additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

The water-borne base coats B may contain conventional additives in conventional quantities, for example, of 0.1 to 5 wt. %, relative to their solids content. Examples are antifoaming agents, wetting agents, adhesion promoters, catalysts, leveling agents, anticratering agents, thickeners and light stabilizers, for example, UV absorbers and/or HALS-based compounds (HALS, hindered amine light stabilizers). If the water-borne base coats B contain light stabilizers, these are by no means solely responsible for UV light being able to penetrate through a coating structure formed from coating compositions A and B only in accordance with a UV transmission of less than 0.1% in the wavelength range of from 280 to 380 nm, of less than 0.5% in the wavelength range of from 380 to 400 nm and of less than 1% in the wavelength range of from 400 to 450 nm. This effect is instead, in particular with regard to the durability thereof, achieved by the coating compositions' A content of the at least one metal platelet pigment having a thickness from 10 to 100 nm.

The water content of the water-borne base coats B is, for example, 60 to 90 wt. %.

The water-borne base coats B may contain conventional solvents, for example, in a proportion of preferably less than 20 wt. %, particularly preferably, less than 15 wt. %. These are conventional coating solvents, which may originate, for example, from production of the binders or are added separately. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether, glycols, for example, ethylene glycol and/or propylene glycol, and the di- or trimers thereof; N-alkylpyrrolidone, such as, for example, N-methylpyrrolidone; ketones, such as, methyl ethyl ketone, acetone, cyclohexanone; aromatic or aliphatic hydrocarbons, for example, toluene, xylene or linear or branched aliphatic C6-C12 hydrocarbons.

In process step 1) of the process according to the invention, the EDC-primed substrates are spray-coated with the aqueous coating composition A in a dry film thickness of, 8 to 20 μm. This is preferably performed using electrostatically-assisted high-speed rotary atomization.

Then, preferably after a brief flash-off phase of, for example, 30 seconds to 5 minutes at an air temperature of 20 to 25° C., the aqueous coating composition B is spray-applied during process step 2) of the process according to the invention in a dry film thickness of 5 to 15 μm. This spray application is preferably pneumatic spray application. Depending on the pigment content of the water-borne base coat B, the dry layer thickness of 5 to 15 μm may be a layer thickness below the black/white opacity. If this is the case, water-borne base coats B with light metallic color shades or silver color shades are preferably used, i.e., water-borne metallic base coats that when applied in a layer thickness above their black/white opacity and overcoated with a 35 μm thick clear coat exhibit a brightness L* (according to CIEL*a*b*, DIN 6174), measured at an illumination angle of 45 degrees to the perpendicular and an observation angle of 15 degrees to the specular, of at least 80 units.

The spray-application of water-borne base coat B is preferably also followed by a brief flash-off phase of, for example, 30 seconds to 10 minutes at an air temperature of 20 to 100° C., after which the clear coat is applied during process step 3) of the process according to the invention in a dry film thickness of, for example, 20 to 60 μm.

All known clear coats are in principle suitable as the clear coat. Usable clear coats are both solvent-containing one-component (1 pack) or two-component (2 pack) clear coats, water-dilutable 1 pack or 2 pack clear coats, powder clear coats or aqueous powder clear coat slurries.

After an optional flash-off phase, the two-layer coating applied from the coating compositions A and B and the clear coat layer are jointly cured, for example, by baking, for example, at 80 to 160° C. object temperature during process step 4) of the process according to the invention. The clear coat layer may provide additional UV protection; however, even if the clear coat layer had no UV absorption properties UV light would be able to penetrate through the coating structure formed from coating compositions A, B and the clear coat to the EDC primer only in accordance with a UV transmission of less than 0.1% in the wavelength range of from 280 to 380 nm, of less than 0.5% in the wavelength range of from 380 to 400 nm and of less than 1% in the wavelength range of from 400 to 450 nm.

It should be noted that the multi-layer coatings produced by the process according to the invention are distinguished by an excellent appearance.

The following examples illustrate the invention.

EXAMPLES

Example 1

Production of a Polyisocyanate Composition 1

30 pbw of N-methylpyrrolidone, 46 pbw of a hydrophilic aliphatic polyisocyanate based on hexamethylene diisocyanate with an NCO value of 17.4 and 24 pbw of Desmodur® N 3600 from Bayer (trimerized hexamethylene diisocyanate with an NCO value of 23) were mixed.

Example 2

Production of a Polyisocyanate Composition 2

30 pbw of N-methylpyrrolidone and 70 pbw of Desmodur® N 3600 from Bayer were mixed.

Example 3

Production of a Coating Agent A 100 pbw of the following composition were mixed with 10 pbw of the polyisocyanate composition 1:

12.2 pbw of resin solids (5.9 pbw of a polyester polyurethane resin, 6.3 pbw of a polyester acrylate resin; hydroxyl value of the resin solids 38.5 mg of KOH/g)

1.8 pbw of Hydroshine® WS 1001 from Eckert (the 1.8 pbw refer to the aluminum platelet pigment contained in the product Hydroshine® WS 1001)

0.2 pbw of dimethylethanolamine 0.5 pbw of defoamer 0.6 pbw of polyacrylic acid thickener 1.2 pbw of polypropylene glycol 400

12.8 pbw of organic solvents (7.3 pbw of ethylene glycol monobutyl ether, 0.8 pbw of N-methylpyrrolidone, 2.3 pbw of n-butanol, 2.4 pbw of n-propanol)

68.4 pbw of water.

Example 4

Production of a Coating Agent A'

Example 3 was repeated with the difference that instead of the 1.8 pbw of Hydroshine® WS 1001 1.8 pbw of Stapa Hydrolac® WH 68 from Eckart were used (the 1.8 pbw refer to the aluminum platelet pigment contained in the product Hydrolac® WH 68).

Example 5

Production of a Coating Agent A"

Example 3 was repeated with the difference that instead of the 1.8 pbw of Hydroshine® WS 1001 5 pbw of Stapa Hydrolac® WH 68 were used (the 5 pbw refer to the aluminum platelet pigment contained in the product Hydrolac® WH 68).

Example 6

Production of a Waterborne Base Coat B

A silver-colored, water-borne base coat B of the following composition was produced:

12.2 pbw of resin solids (5.9 pbw of a polyester polyurethane resin, 6.3 pbw of a polyester acrylate resin; hydroxyl value of the resin solids 38.5 mg of KOH/g)

4.1 pbw of non-leafing aluminum platelet pigments (1.6 pbw of Stapa Hydrolac® WHH 2154, 1.5 pbw of Stapa Hydrolac® WHH 2156, 1.0 pbw of Stapa Hydrolac® WHH 44668; Hydrolac®, aluminum platelet pigments from Eckart; the pbw in each case refer to the aluminum platelet pigment contained in the Hydrolac® products)

0.2 pbw of dimethylethanolamine 0.5 pbw of defoamer 0.6 pbw of polyacrylic acid thickener 1.2 pbw of polypropylene glycol 400

12.8 pbw of organic solvents (7.3 pbw of ethylene glycol monobutyl ether, 0.8 pbw of N-methylpyrrolidone, 2.3 pbw of n-butanol, 2.4 pbw of n-propanol)

68.4 pbw of water.

Example 7

Production of a Coating Agent B'

100 pbw of the water-borne base coat B were mixed with 10 pbw of the polyisocyanate composition 2.

Example 8

Measurement of the UV Transmission of Coating Structures

The coating agents A, A', A" and B' respectively were each applied to a quartz glass plate by means of electrostatically-assisted high-speed rotary atomization.

After 2 minutes flashing off at room temperature, the water-borne base coat B was pneumatically spray-applied in 5 μm film thickness, flashed off for 5 minutes at 70° C. and baked for 15 minutes at 140° C. Then, the UV transmission of the quartz glass plates coated in this way with two-layer coating structures was photometrically determined (uncoated quartz glass plate in reference beam path; UV irradiation from the coated side).

The results are shown in Table 1.

TABLE 1

| Coating structure with layer thickness in μm | UV transmission in the wavelength range 280 to 380 nm | 380 to 400 nm | 400 to 450 nm |
|---|---|---|---|
| 10 μm A + 5 μm B (according to the invention) | in the range of 0 to 0.05% (ok, below 0.1% in the 280 to 380 nm range, below 0.5% in the 380 to 400 nm range and below 1% in the 400 to 450 nm range) | | |
| 10 μm A' + 5 μm B | in the range of 0 to 1.8% (nok, above 0.1%) | in the range of 1.8 to 1.9% (nok, above 0.5% in the 380 to 400 nm range and above 1% in the 400 to 450 nm range) | |

TABLE 1-continued

| Coating structure with layer thickness in µm | UV transmission in the wavelength range 280 to 380 nm | 380 to 400 nm | 400 to 450 nm |
|---|---|---|---|
| 10 µm A" + 5 µm B | in the range of 0 to 0.06% (ok, below 0.1%) | in the range of 0.06 to 0.08% (ok, below 0.5% in the 380 to 400 nm range and below 1% in the 400 to 450 nm range) | |
| 10 µm B' + 5 µm B | in the range of 0 to 0.5% (nok, above 0.1%) | in the range of 0.5 to 0.6% (nok, above 0.5%) | in the range of 0.5 to 0.6% (ok, below 1%) |

Example 9

Production of Multilayer Coatings

The coating agents A, A', and A" respectively were each spray-applied to steel test panels provided with a 22 µm thick electrocoat precoating in 10 µm dry film thickness by means of electrostatically-assisted high-speed rotary atomization.

After 2 minutes flashing off at 20° C., the water-borne base coat B was pneumatically spray-applied in 5 µm film thickness. After flashing-off for 5 minutes at 20° C. and additional 5 minutes at 80° C. the test panels were each spray coated with a commercial two-component polyurethane clear coat in 35 µm dry film thickness and after flashing-off for 5 minutes at 20° C. baked for 20 minutes at 140° C. object temperature. The appearance of the multilayer coatings obtained was determined by measurement of the short and long wave using the measuring device Wavescan from Byk-Gardner.

The results are shown in Table 2.

TABLE 2

| coating | Short-wave | Long-wave |
|---|---|---|
| A + B | 12 | 3 |
| A' + B | 14 | 3 |
| A" + B | 18 | 4 |

What is claimed is:

1. A process for the production of multi-layer coatings comprising the successive steps:

1) applying an 8 to 20 µm thick coating layer from an aqueous coating composition A onto a substrate provided with an EDC primer, 2) applying a 5 to 15 µm thick base coat layer from an aqueous coating composition B onto the previously applied coating layer, 3) applying a clear coat layer onto the base coat layer, 4) jointly curing the three coating layers, wherein coating compositions A and B being different from each other and wherein the coating composition A contains at least one metal platelet pigment having a thickness from 10 to 100 nm in a proportion corresponding to a pigment/resin solids ratio by weight from 0.06:1 to 0.2:1, and wherein coating composition B is free from the at least one metal platelet pigment having a thickness from 10 to 100 nm.

2. The process of claim 1, wherein the sum of the coating thickness for the two-layer coatings produced from the coating compositions A and B is 15 to 35 µm.

3. The process of claim 1 or 2, wherein the resin solids of coating composition A comprise polyurethane resin and/or are crosslinkable by formation of urethane groups.

4. The process of claim 1, wherein the coating compositions B are distinguished in that UV light corresponding to a UV transmission of more than 0.1% in the wavelength range of from 280 to 380 nm and/or of more than 0.5% in the wavelength range of from 380 to 400 nm and/or of more than 1% in the wavelength range of from 400 to 450 nm may penetrate through a two-layer coating structure consisting of a 10 µm thick layer applied from a mixture produced in a resin solids ratio by weight of 1.5 pbw coating composition B to 1 pbw trimeric hexane diisocyanate-polyisocyanate, and a 5 µm thick layer applied from the coating composition B itself.

5. The process of claim 1, wherein the substrate provided with an EDC primer is selected from the group consisting of automotive bodies and automotive body parts.

6. Substrate coated with a multi-layer coating produced according to the process of claim 1.

* * * * *